United States Patent
Pieri et al.

[11] 3,725,526
[45] Apr. 3, 1973

[54] PROCESS FOR PRODUCING PIGMENT QUALITY TITANIUM DIOXIDE

[75] Inventors: Giovanni Pieri; Aldo Ducato, both of Novara, Italy; Llewellyn John Held, Palmerton, Pa.; Gianfranco Bedetti, Milan, Italy

[73] Assignees: Montecatini Edison S.p.A., Milan, Italy; The New Jersey Zinc Co., New York, N.Y.

[22] Filed: Aug. 17, 1970

[21] Appl. No.: 72,561

[30] Foreign Application Priority Data

Aug. 29, 1969 Italy.................................21066 A/69

[52] U.S. Cl. ..................423/613, 423/592, 423/659, 23/277
[51] Int. Cl. .............................................C01g 23/04
[58] Field of Search .........23/202 V, 202, 1 B; 106/3; 423/613, 612, 614, 592, 659

[56] References Cited

UNITED STATES PATENTS

| | | | |
|---|---|---|---|
| 2,823,982 | 2/1958 | Saladin et al. | 23/202 V |
| 3,203,763 | 8/1965 | Kruse | 23/202 V |
| 3,414,379 | 12/1968 | Wigginton et al. | 23/202 V |
| 3,443,897 | 5/1969 | Wilson et al. | 23/202 V |
| 3,485,584 | 12/1969 | Zirngibl et al. | 23/202 V |
| 3,512,219 | 5/1970 | Stern et al. | 23/202 V X |

*Primary Examiner*—Edward Stern
*Attorney*—Hubbell, Cohen & Stiefel

[57] ABSTRACT

A reactor for producing finely divided particles of rutile titanium dioxide including a cylindrical reaction chamber, an outwardly diverging frusto-conical duct having an oxidizing gas inlet at its narrow upstream end and a length of between 0.5 and 10 times the diameter of the reaction chamber, an annular slot for introducing titanium tetrachloride into the device at an angle of 0° to 45° to a perpendicular to the longitudinal axis of the reactor, the slot being located downstream of the divergent duct, the reaction chamber being downstream of the slot and coaxial with the divergent duct. The invention is also related to a method of producing titanium dioxide by oxidizing titanium tetrachloride in a reactor of the type above described.

3 Claims, 3 Drawing Figures

PROCESS FOR PRODUCING PIGMENT QUALITY TITANIUM DIOXIDE

BACKGROUND OF THE INVENTION

1. Field of the Invention

The present invention relates to an improved reactor for producing titanium dioxide in the form of finely divided particles by reacting in the gaseous phase titanium tetrachloride with an oxidizing gas, and to a method of producing titanium dioxide using said reactor.

2. The Prior Art

It is well known that in the production of $TiO_2$ by reacting in the gaseous phase $TiCl_4$ with oxygen according to the following reaction: $TiCl_4 + O_2 \rightarrow TiO_2 + 2Cl_2$, it is possible to identify several transformation steps: formation of solid nuclei of $TiO_2$ inside the gaseous phase (nucleation step); growing of these nuclei into crystalline macroscopic aggregates by heterogenous reaction of reagents on the surface of the aggregates themselves; and agglomeration by an elastic type collision between two or more crystals, thus forming particles of larger dimensions.

Furthermore, it is well known that some of the characteristics of the pigment such as, for instance, the average diameter and the particle size distribution depend on whether or not the nucleation step is favored over the growing steps. If nucleation is favored, a greater number of small diameter particles (for instance, less than 0.1 microns) will be obtained; when the growing steps prevail over the nucleation step, a smaller number of particles, said particles being of relatively large dimensions, will be obtained. In order to possess good pigment characteristics, the titanium dioxide particles must have an average diameter not less than 0.18 microns. Therefore, one usually operates so that the growing steps prevail over the nucleation step.

Several types of processes and reactors are known for achieving this end. For instance, one can carry out the mixing of the main streams of $TiCl_4$ and $O_2$ in the presence of $TiO_2$ seeds obtained by reacting an auxiliary stream of $TiCl_4$ with steam or with a hydrogen-oxygen mixture. For producing such seeds, it is possible to use, instead of $TiCl_4$, different metal halides, as for instance $AlCl_3$, $SiCl_4$, $ZrCl_4$ or $ZnCl_2$. These halides change, as $TiCl_4$ does, into white oxides. However, in these processes, chlorine is degraded by water into HCl and corrosion phenomena occur. Also, one may recycle solid particles toward the mixing zone of reagents, such recycling making available $TiO_2$ seeds which grow, forming particles of larger dimensions.

There have recently been disclosed radial reactors endowed with high feeding speed, whereby one tries to achieve the foregoing ends. This kind of reactor is schematically shown in FIG. 1. In this radial reactor, sketched in sectional view taken along the longitudinal axis, the preheated $TiCl_4$ stream is fed through the annular slot 1. Walls 2 and 3 of slot 1 form an angle $\alpha$ which usually ranges between 0° and 45°, with the perpendicular drawn to the reactor axis. The preheated and swirled oxidizing gas (preheating and swirling devices are not shown in FIG. 1 for the sake of simplicity) is fed at the top through duct 4. Downstream of slot 1, the reactor enlarges into frusto-conical duct 5 which is both a mixing and reaction zone between $TiCl_4$ and $O_2$. Inclined wall 6 which fixes the boundaries of frusto-conical zone 5 forms an angle $\beta$ (usually ranging between 1° and 45°) with the reactor's axis and joins downstream with cylindrical wall 7. It is generally believed that such inclined wall is useful both in order to separate the gaseous and solid particles stream from the reactor walls, thus hindering or markedly reducing the formation of titanium dioxide deposits or crusts on the walls, and in order to sustain the flame and stabilize the reaction, as well as to cause the hot gases along with small particles of the product to be recycled towards the slot zone.

However, the use of the apparatus shown in FIG. 1 possesses several major disadvantages. For example, in order to increase the dimensions of the product, one needs to increase the mixing time of the reagents (which usually ranges between 1 and 100 milliseconds) and therefore, when keeping the flow rate constant, to build a reactor having large diameter and low speed of reagents. Such a reactor presents many drawbacks, as, for instance, the obstruction of the reactor itself, the contamination of the final products by the crusts, the obtaining of a product made up of particles which are too large and uneven in size, and large heat dispersions in the case of cooled reactors. With an apparatus of the same kind, but of smaller dimensions, one has to operate with a very short mixing time, thus obtaining too small a product. Further, the products' recycling (illustrated by small arrows in FIG. 1) does not produce sufficient seeding inasmuch as it is limited to a small zone downstream of the slot 1. Moreover, the recycling involves mainly incompletely reacted products and occurs at rather low temperatures, close to the mixing temperature. Upstream of slot 1, there is no recycling whatever, as clearly indicated in FIG. 1.

SUMMARY OF THE INVENTION

In accordance with one of its main aspects, a new kind of radial reactor is provided which causes a large recycling of solid products obtained downstream of the $TiCl_4$ feeding zone. At the same time, a drawing of $TiCl_4$ into a high-temperature, oxygen-rich zone upstream of the feeding zone of $TiCl_4$ is achieved. In such an oxygen-rich zone, the growing of the recycled solid products is greatly promoted while nucleation is not encouraged, thus achieving the formation of a smaller number of $TiO_2$ particles having larger dimensions. Such a reactor for producing titanium dioxide by reacting in a gaseous phase $TiCl_4$ with oxygen or with oxygen-containing gas (hereinbelow simply referred to as "oxidizing gas") comprises an elongated, cylindrical, axially open reaction chamber, means for imparting to the preheated oxidizing gas a swirling motion, means for introducing said swirling oxidizing gas and said titanium tetrachloride into the top of said reaction chamber, the introducing means including a duct for the oxidizing gas and an annular slot in the reaction chamber for radially introducing the titanium tetrachloride.

The reactor is characterized by (a) the duct for feeding the top end of the reaction chamber diverging in the direction of the stream of the oxidizing gas, such divergent duct being preferably frusto-conical, such frusto-conical duct forming an angle of from 5° to 30° with the reactor axis and having a projection on that axis of from 0.5 to 10 times the diameter D of the cylindrical reaction chamber; (b) the annular slot for radially introducing TiCl$_4$ being located downstream of the divergent frusto-conical duct, its diameter being equal to that of the reaction chamber, its height ranging between one-tenth and one one-hundredth of the diameter D of the reaction chamber, its internal walls being inclined from 0° to 45° with respect to the perpendicular of the reactor axis; (c) the cylindrical reaction chamber which joins upstream to the circular slot having a length of from 5 to 20 times its diameter D.

In this reactor, in accordance with the present invention, between the annular slot, which is always located downstream from the divergent duct, and the divergent duct itself, there may be, if desired, a cylindrical duct of diameter D, having a length up to four times diameter D.

DETAILED DESCRIPTION OF THE PREFERRED EMBODIMENTS

Figure 2:
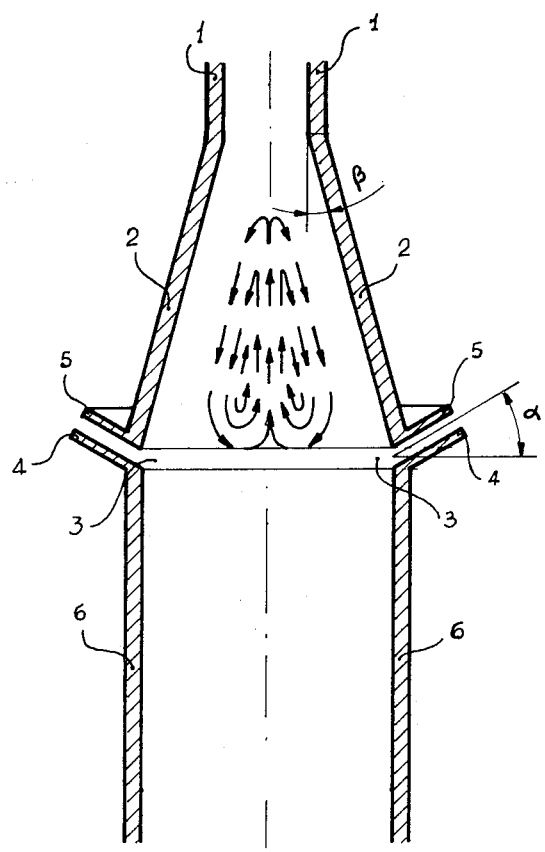
FIG. 2 is a view similar to FIG. 1 illustrating one form of the present invention.

Referring now in detail to FIG. 2, the reactor of the present invention comprises (from top to bottom or upstream to downstream; that is, in the same direction in which the reagent gases flow): a cylindrical duct 1 through which a preheated and swirled oxidizing gas flows (the well known preheating and swirling devices being omitted from the drawing for the sake of simplicity). Cylindrical duct 1 has an internal diameter $d$. The reactor further includes a frusto-conical duct 2 which diverges in the direction of flow of the oxidizing gas. The angle of divergence of the frusto-conical duct 2 is designated angle $\beta$ and may vary from 5° to 30°. The downstream or lower end of duct 2 communicates with a cylindrical reaction chamber 6 having a diameter D. The axial length or extent of the frusto-conical duct may vary between 0.5 and 10 times the diameter D of the cylindrical reaction chamber 6. An annular slot 3 through which the preheated TiCl$_4$ is fed is located on the circumference of the cylindrical wall. (The preheating means for the TiCl$_4$ is well known and is omitted from the drawing for the sake of clarity). The slot has a height between about one-tenth and one one-hundredth the diameter D of the cylindrical reaction chamber 6. The walls 4 and 5 of the slot 3 form an angle $\alpha$ with a line or plane perpendicular to the reactor axis. Angle $\alpha$ may vary between about 0° and 45°. The cylindrical reaction chamber 6 has a length varying from 5 to 20 times its diameter D.

Figure 3:
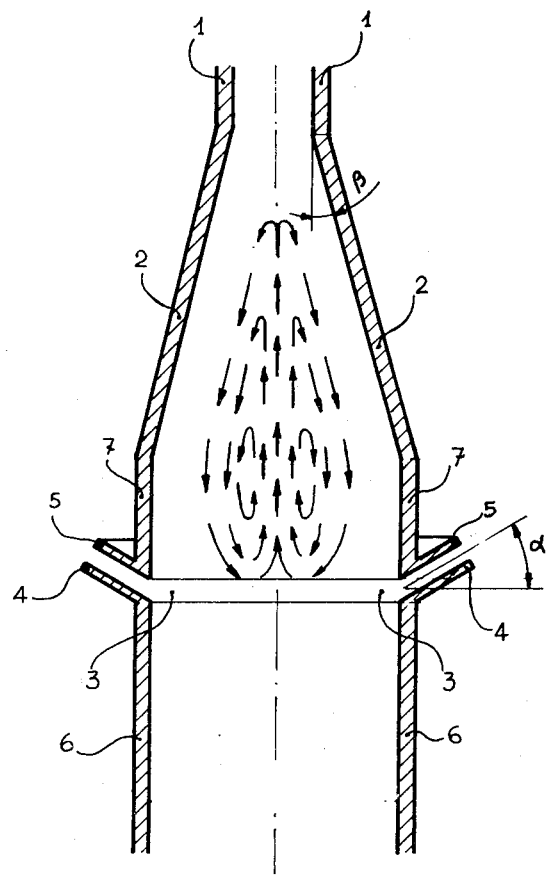
FIG. 3 is a view similar to FIGS. 1 and 2 showing a modification of the present invention.

Referring now in detail to FIG. 3, symbols 1, 2, 3, 4, 5, 6, $\alpha$ and $\beta$, indicate the same structural elements as in FIG. 2. The reactor shown in FIG. 3 differs from the reactor of FIG. 2, due to the presence of a cylindrical duct 7 located downstream of frusto-conical duct 2 and upstream of slot 3. Such a cylindrical duct 7 has a diameter D equal to that of the cylindrical reaction chamber 6 and may have a height up to four times diameter D. From an analytical viewpoint it can be said that the reactor shown in FIG. 2 is a special case of reactor shown in FIG. 3 in which the height of the cylindrical duct 7 is equal to zero.

Figure 1:
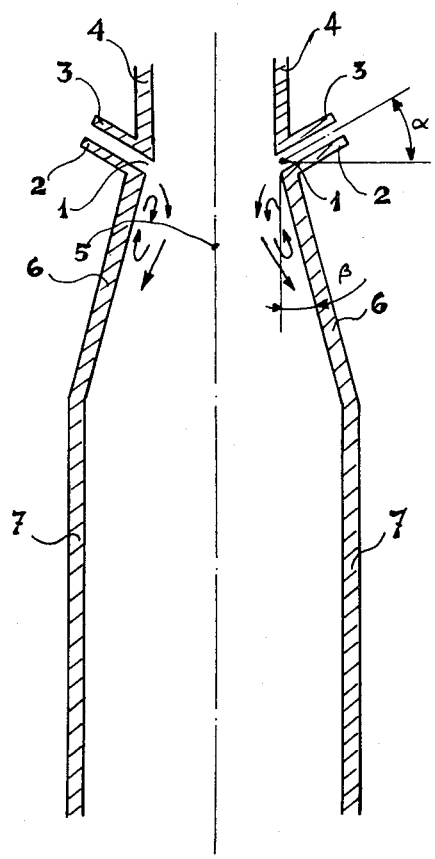
FIG. 1 is a longitudinal sectional view, somewhat schematic, of a prior art reactor for making titanium dioxide.

In both FIG. 2 and FIG. 3, the meaning of small arrows is the same as in FIG. 1; that is, they indicate the direction of the recycling of solid products. The reactors in accordance with the invention are preferably constructed of high temperature and corrosion resistant alloys. For instance, one may use inox steels, 16—25—6 (Cr—Ni—Mo), cobalt bearing steel alloys such as Haynes alloys, nickel-steel alloys such as nimonic, inconel and hastelloy alloys.

Although it is not shown, as is well known, the walls of such reactors (both in the combustion and reaction zones) are cooled, for instance with pressurized water or with diathermic oils, for maintaining the walls at temperatures ranging between 300° and 500°C.

As already indicated, the means and the thereto related methods for preheating the reagents are well known in the prior art. The most widely used are: indirect heating of reagents to 800°–1,000°C before introducing them into the combustion chamber in suitable chambers lined with inert materials such as for instance quartz, amorphous carbon or graphite; or direct heating by means of an auxiliary flame obtained by burning a mixture of carbon monoxide and oxygen.

Well known devices suitable for giving the gas a swirling motion (devices hereinbelow referred to as swirlers) are, for instance:

1. devices that feed the gas tangentially into a cylindrical chamber (as in cyclones);

2. devices that pass the gas through blades which are formed at an angle to the axis of the duct (such as a Kaplan turbine);

3. devices that pass the gas through canals which form an angle with the axis of the duct (helical gearing type);

4. devices containing a helical vane.

In the field of the production of pigment quality titanium dioxide, some satisfactory types of swirlers are, for instance, disclosed in U.S. Pat. No. 3,069,282 and in French Pat. No. 1,504,660.

In order to properly analyze from a fluid-dynamic point of view the kinetic characteristics of a swirled gas, a new parameter known as the swirl number has been recently adopted. Such swirl number is described in the article of J. Chedaille, W. Leuckel, A. K. Chesters "Aerodynamic Studies Carried Out on Turbulent Jets by the International Flame Research Foundation," in the Journal of the Institute of Fuel, 39 (1966) 506–521. Such swirl number is defined as follows:

$$S = (2 \cdot g)/(.G_a)$$

wherein $S$ = swirl number; $G$ = axial flux of moment of momentum with respect to the axis of the apparatus through a section of the throat through which the gas passes; $G_a$ = axial flux of axial momentum through the section of the throat; $d$ = diameter of the throat. The axial flux G is a product of volumetric flow-rate times linear gas speed times axial length of the reaction chamber and may be expressed in Kg.m.$^2$sec.$^{-2}$. The flux $G_a$ is a product of flow-rate times speed and may be expressed in Kg.m.sec.$^{-2}$; diameter $d$ may be expressed in meters. Therefore number S is a dimensionless number which does not vary with the adopted system of units. When a gas has a swirl number equal to zero, one will have a pure linear motion along the direction of the apparatus axis, while with a swirl number equal to infinity, one will have a pure rotational motion (that is, without an axial component). For values of the swirl number ranging between these two limits, one will have both rotational and linear motion along the direction of the apparatus axis, that is, helical motion.

As already indicated the present invention includes a process for producing pigment quality titanium dioxide by reacting in a gaseous phase a mixture of titanium tetrachloride and oxygen or an oxygen containing gas, at temperatures above 1,000°C, preferably between 1,100° and 1,500°C, comprising:

A. Separately preheating the oxidizing gas to about 700°–900°C and the titanium tetrachloride to about 400°–600°C;

B. Causing the preheated oxidizing gas to be swirled, for instance by passing it through a duct containing an helical vane;

C. Mixing the preheated and swirled oxidizing gas with a stream of carbon monoxide previously heated at about 300°–500°C. Usually, carbon monoxide does not possess before being mixed with the swirled oxidizing gas any helical motion.

D. Burning the oxidizing gas/carbon monoxide mixture in an auxiliary flame, thereby reaching a temperature of about 1,800°–2,300°C.

The burnt mixture which comprises the carbon dioxide obtained by combustion of carbon monoxide, still contains a sufficient amount of oxidizing gas to ensure a complete conversion of $TiCl_4$ to $TiO_2$.

To this purpose, usually an excess of oxidizing gas with respect to the stechiometric amount needed is used, preferably from 1.05 to 1.4 moles of oxygen per mole of $TiCl_4$.

This burnt mixture, which is still endowed with a helical motion is still hereinbelow referred to as "oxidizing gas."

E. Feeding this heated (1,800°–2,300°C) and swirled oxidizing gas at the top end of a divergent, preferably frusto-conical duct which joins at its bottom end with the top end of an elongated, substantially cylindrical, axially open reaction chamber.

When the oxidizing gas passes through the top end of the divergent, preferably frusto-conical duct, it possess a swirl number ranging between about 0.2 and 20.0

The frusto-conical duct is co-axial with said reaction chamber; it forms an angle from 5° to 30° with the reactor axis and has a projection on said axis from 0.5 to 10 times the diameter D of the cylindrical reaction chamber.

F. Feeding said pre-heated titanium tetrachloride downstream from the divergent preferably frusto-conical duct, through an annular slot having a height comprised between one-tenth and one one-hundredth of diameter D, having internal walls with an inclination comprised between 0° and 45° with respect to the perpendicular to the reactor axis, and downstream thereof the reaction chamber extends over a length equal to 5–20 times the diameter D. The $TiCl_4$ momentum ranges between one-twentieth and thirty-twentieths of momentum of the oxidizing gas.

Along with the $TiCl_4$, a rutilizing agent, such as for instance, $AlCl_3$ or $TiCl_3$ may be fed in amounts of from 0.1 to 2 percent by weight with respect to the $TiCl_4$. The residence time of the reagent mixture in the reaction chamber may vary from 30 milliseconds to 1 second.

Such a process is advantageously carried out in the above disclosed reactors in accordance with the invention. The hot oxidizing gas enters the duct which is divergent along the flow direction of the gas itself (for instance, the frusto-conical duct in the reactor shown in FIGS. 2 or 3) wherein it is caused to expand. As a consequence of the centrifugal force due to the helical motion with which it is endowed, the hot gas tends to concentrate along the wall of the duct itself. As a consequence of the expansion, the gas tends on the contrary to be less concentrated in a zone close to the axis of the frusto-conical duct, thus producing a recycling path of large dimensions. The motion of the gas inside the frusto-conical duct is, in fact, helical and downwardly directed close to the walls, helical and upwardly directed in the central zone. If downstream from the frusto-conical duct there is a cylindrical duct, the motion will continue therein substantially with the same characteristics. Such a situation continues in such duct over a length that may be several times the diameter of the duct itself, (up to four times the diameter) and thereafter tends to disappear. Up to four times the diameter of the cylindrical duct there are no appreciable variations in flow pattern.

The $TiCl_4$ is endowed with a momentum ranging between one-twentieth and thirty-twentieths of the momentum of the oxidizing gas. Such values of the momentum cause the mixing of the hot stream of oxidizing gas with $TiCl_4$, so that the $TiCl_4$ partly passes through the reaction chamber converging toward the center in that zone wherein there is an upwardly directed motion. In such a way, a part of $TiCl_4$ and of the combustion products are drawn toward the hot gases and mixed therewith before the hot gases mix with the main stream of $TiCl_4$. The central recycling zone extends over a short distance downstream from the slot and then ends due to the action of the momentum of the $TiCl_4$ which tends to push the gas toward the axis. The smaller angle alpha is and the larger the ratio of the momenta is, the stronger is this result. Being alpha = 0°, the recycling path extends only to the slot zone and the amount of $TiCl_4$ dragged upstream is small. Being alpha around 45°, the recycling path extends downstream of the slot zone and the amount of $TiCl_4$ dragged upstream is large. Falling alpha's values within the range disclosed, the amount of $TiCl_4$ dragged upstream is large enough to cause an excellent insemination, yet not as much to cause the obtainment of a product too much uneven in size. Downstream from the slot, the mixing of $TiCl_4$ with the hot gases continues and it is possible to say that it is completed at an axial distance downstream of the slot ranging from ½ to 5 times the diameter D of the reaction chamber.

The titanium dioxide obtained by means of the reactor and of the process of the present invention is endowed with excellent pigmentary characteristics inasmuch as it is substantially all made up of rutile. It is well known that rutile is more valuable as a pigment than anatase. In fact, the mean refractive indexes of anatase and rutile are about 2.57 and 2.71 respectively, the highest of known pigments. Rutile, having the higher refractive index, has a higher opacity than anatase in any one paint medium. Therefore, the tinting strength of rutile is higher than anatase namely 1,450–1,900 vs. 1,200–1,300. Furthermore, the titanium dioxide of our invention has a narrow distribution of particle dimensions. The average particle size is of from 0.18 to 0.25 microns. The percent number coefficient of variation ranges between 25 and 35 percent.

As a measure of the average particle size, we adopt the "arithmetic mean,"

$$\overline{d_{10}}$$

which is defined as follows:

$$\overline{d_{10}} = \frac{1}{n} \sum_{1} d_i f_i$$

wherein:
$n$ is the total number of particles measured (in our experimental data, $n = 2,000$);
$d_i$ is the diameter of a given particle;
$f_i$ is the frequency, i.e. the number of particles having diameter $d_i$.

This arithmetic mean is defined, for instance, in "Particle size = Theory and Industrial Application" by Richard D. Cadle, Reinhold Pub. Co., New York 1965, the relevant part of which is here incorporated by reference.

As a measure of the particle size distribution, we adopt the "percent number coefficient of variation." By "percent number coefficient of variation" (hereinbelow simply referred to as $v$), we mean the following percent ratio:

$$v = \frac{s}{\overline{d_{10}}} \times 100$$

wherein:
$s$ is the standard deviation of a distribution, equal to square root of the variance.
(The variance of a distribution is equal to the mean of the square of the deviations from the mean).
As it is known, the standard deviation is a measure of the average spread of the distribution.

$$\overline{d_{10}}$$

is the above mentioned arithmetic mean.

This "percent number coefficient of variation" is defined for instance in "Statistical methods in research and production with special reference to the chemical industry" by Owen L. Davies, Oliver and Boyd, London 1963, the relevant part of which is here incorporated by reference. The average particle diameter is of from 0.18 to 0.25 microns. The pigment obtained in accordance with the present invention shows furthermore an excellent decoloration power. The values of tinting strength were determined with the New Jersey Zinc method described in a book by H. A. Gardner and G. C. Sward, "Paints, Varnishes, Lacquers and Colors," Gardner Lab. Inc., Bethesda, Maryland, U.S.A. (page 52, 12th Edition, March 1962). Regular tinting strength is measured by mixing one gram of $TiO_2$ with 0.82 grams of castor oil and with a determined amount of black pigment (made up of one part by weight of black powder and 7 parts by weight of calcium carbonate); the homogenized sample is then compared with a standard sample. The amount of black pigment needed in order to obtain the equivalence between the tested sample and the standard sample gives the measure of the tinting strength. The test called "dilute tinting strength" is carried out in a similar manner, while starting with a mixture of 0.15 grams of $TiO_2$ and 0.85 grams of calcium carbonate. The difference between the regular tinting strength and the dilute strength, and the tone of the grey mixture gives information on the pigment granulometry.

The following examples are given to further illustrate the inventive idea of the present invention. The data of Example 1 have been obtained by means of the conventional reactor of the prior art shown in FIG. 1, and are given for the purpose of comparison with the data obtained by means of the process of the present invention shown in FIGS. 2 and 3.

EXAMPLE 1

A reactor of the type shown in FIG. 1 is employed. Its characteristics are as follows:
Diameter of the cylindrical reaction chamber 7 = 100 mm;
Angle $\alpha = 30°$;
Angle $\beta = 10°$;
Overall length of the reactor (zones 6+7) = 1,300 mm.
Height of slot 1 = 2 mm.
Diameter of the slot 1 = 37 mm.
38 Nm³/h of oxidizing gas at a temperature of 1,800°–2,000°C containing about 65 percent of oxygen are fed into the reactor. The oxidizing gas is obtained by combustion of CO with $O_2$. The value of the swirl number of the oxidizing gas in 4 is 1.4. The diameter of the throat in 4 is 25 mm. 180 Kg/h of $TiCl_4$ containing about 1 percent of $AlCl_3$ as rutilizing agent, at a temperature of 500°C are fed through the annular slot. The speed of the oxidizing gas in 4 is about 190 m/sec. and that of $TiCl_4$ in 1 is about 80 m/sec. The residence time of the reagents in the zone comprised between 6 and 7 is about 85 milliseconds. Reaction temperature is 1,470°C. The gas and the reaction products are quickly cooled when they leave the reactor to a temperature of 400°C. Thereafter, $TiO_2$ is separated from gaseous compounds. After a four-hour run, 280 kilos of $TiO_2$ of poor pigmentary characteristics are collected. The particles have an average diameter of 0.14 microns and percent number coefficient of variation of 36.2 percent. The value of regular tinting strength is 1,460 blue tone 4. The value of the dilute tinting strength is 1,660 blue tone 4.

EXAMPLE 2

A reactor of the type shown in FIG. 2 is used. Its characteristics are as follows:
Internal diameter D of the reaction chamber = 100 mm.
Angle $\alpha = 30°$;

Angle β = 10°
Overall length of the reaction chamber (zone 6) = 1,400 mm;
Height of slot 3 = 2 mm.

34 Nm³/h of oxidizing gas at a temperature of 1,800°–2,000°C containing about 65 percent of oxygen are fed to the reactor. The oxidizing gas is obtained by combustion of CO with $O_2$. The value of the swirl number of the oxidizing gas in 1 is 1.2; the diameter $d$ in duct 1 is 25 mm; 180 Kg/h of $TiCl_4$ containing 1 percent of $AlCl_3$ as rutilizing agent at a temperature of 500°C are fed through the annular slot. The speed of the oxidizing gas in 1 is 190 m/sec. The speed of the $TiCl_4$ is slot 3 is 30 m/sec. The reaction temperature is about 1,470°C. The residence time of the gas in the reaction zone 6 is 90 milliseconds. The gas and the reaction products are quickly cooled when they leave the reactor to the temperature of 400°C. Thereafter, the titanium dioxide is separated from gaseous compounds. After 4 hours, 320 kilos of $TiO_2$, all rutile endowed with excellent pigmentary characteristics, are collected. The average diameter of particles is 0.21 microns. The percent number coefficient of variation is 32.1 percent. The value of regular tinting strength is 1,630 blue tone 2. The value of dilute tinting strength is 1,700 blue tone 1.

EXAMPLE 3

The reactor shown in FIG. 2 is still used. Its characteristics are as follows:
Internal diameter D of the reaction chamber = 100 mm;
Angle α = 30°;
Angle β = 10°;
Overall length of the reaction chamber (zone 6) = 1,400 mm;
Height of slot 3 = 4.5 mm.

18 Nm³/h of oxidizing gas at a temperature of 1,800°–2000°C containing about 63 percent of oxygen are fed to the reactor. The oxidizing gas is obtained by combustion of CO with $O_2$.

The value of the swirl number of the oxidizing gas in 1 is 1.2. The diameter $d$ is 25 mm. 90 kilos per hour of $TiCl_4$ containing 1 percent of $AlCl_3$ as rutilizing agent, at a temperature of 500°C are fed through the annular slot. The velocity of the oxidizing gas in 1 is 85 m/sec. The velocity of $TiCl_4$ in 3 is 7 m/sec. The residence time of the mixture in 6 is 207 milliseconds. The reaction temperature is 1,400°C. Gas and reaction products are cooled to a temperature of 400°C. Thereafter, the titanium dioxide is separated from gaseous compound. After a 4-hour run, 140 kilos of $TiO_2$ of rutile endowed with excellent pigmentary characteristics are collected. Average diameter of particles is 0.23 microns; the percent number coefficient of variation is 32 percent; the value of regular tinting strength is 1,700 blue tone 1. The value of dilute tinting strength is 1,700 blue tone 1.

EXAMPLE 4

A reactor of the type shown in FIG. 3 is used. Its characteristics are as follows:
Internal diameter D of reaction chamber = 100 mm.
Angle α = 30°;
Angle β = 10°;
Length of cylindrical duct 7 is 400 mm;
Length of zone 6 = 1,170 mm.;
Height of annular slot = 2 mm.;
23 Nm³/h of oxidizing gas at 1,800°–2,000°C containing about 65 percent $O_2$ are fed to the reactor. The oxidizing gas is obtained by combustion of CO with $O_2$. The value of the swirl number of oxidizing gas is 1.4; diameter $d$ is 25 mm.; 90 kg/h of $TiCl_4$ containing 1 percent of $AlCl_3$ as rutilizing agent, are fed through annular slot 3, at a temperature of 500°C. The velocity of oxidizing gas in 1 is 100 m/sec. The velocity of $TiCl_4$ in 3 is 15 m/sec. Residence time is 180 milliseconds.

The reaction temperature is 1,300°C. The gases and the reaction products are cooled to a temperature of 400°. Thereafter, the titanium dioxide is separated from gaseous compounds. After a 2-hour run, 75 kilos of $TiO_2$ (rutile) endowed with excellent pigmentary characteristics are collected. The average diameter of the particles is 0.21 microns. The percent number coefficient of variation is 34 percent. The value of regular tinting strength is 1,650 blue tone 1. The value of dilute tinting strength is 1,680 blue tone 1.

Variations can, of course, be made without departing from the spirit and scope of the invention.

Having thus described the invention, what is desired to be secured by Letters Patent and hereby claimed is:

1. In a process for producing pigment quality titanium dioxide by reacting gaseous titanium tetrachloride with an oxygen containing gas at a temperature of from about 1,000° to about 1,500°C., the improvement comprising:

a. preheating said oxygen containing gas to a temperature of from about 1,800° to 2,300°C., imparting to the preheated oxygen containing gas a helical motion characterized by a swirl number between about 0.2 and 20 and feeding said swirling gas at the top end of a reactor comprising a peripherally continuous side wall defining a downwardly divergent frusto-conical duct for introducing said oxygen containing gas into said reactor and an elongated substantially cylindrical axially open reaction chamber stacked beneath and coaxial with said frusto-conical duct, said wall having an annular slot therein located not above the bottom of the frusto-conical duct, said wall extending downstream of said slot for a distance of from about 5 to 20 times the diameter of the reaction chamber, said frusto-conical duct forming an angle with the reactor axis of from about 5° to 30° and having a projection on said axis of from about 0.5 to 10 times the diameter of the reaction chamber; and b. heating the titanium tetrachloride to about 400° to 600°C. and feeding the heated titanium tetrachloride through said annular slot into said reaction chamber, said annular slot having a height of between about one-tenth and one one-hundredth of the diameter of said reaction chamber and being inclined at an angle of about 0° to 45° to a line perpendicular to the reactor axis.

2. The process of claim 1, characterized in that the residence time of said mixture in the reaction chamber varies from 30 milliseconds to one second.

3. The process of claim 1, characterized in that the $TiCl_4$ is fed through said annular slot having a momentum of from one-twentieth to thirty-twentieths the momentum of the oxidizing gas.

* * * * *

UNITED STATES PATENT OFFICE
CERTIFICATE OF CORRECTION

Patent No. 3,725,526  Dated April 3, 1973

Inventor(s) Giovanni Pieri, Aldo Ducato, Llewellyn John Held and Gianfranco Bedetti It is certified that error appears in the above-identified patent and that said Letters Patent are hereby corrected as shown below:

Column 4, line 55: "$S=(2.g)/(.G_a)$" should read --$S= \dfrac{2.G}{d.G_a}$--; see Specification, page 9, line 13.

Signed and Sealed this tenth Day of February 1976

[SEAL]

Attest:

RUTH C. MASON
*Attesting Officer*

C. MARSHALL DANN
*Commissioner of Patents and Trademarks*